United States Patent [19]
van Maanen

[11] Patent Number: 6,000,528
[45] Date of Patent: Dec. 14, 1999

[54] CONVEYOR DEVICE FOR ACCELERATING A SERIES OF PRODUCTS

[75] Inventor: Johannes Dominicus van Maanen, Berkel en Rodenrijs, Netherlands

[73] Assignee: Klockner Hansel Tevopharm B.V., Schiedam, Netherlands

[21] Appl. No.: 09/102,073

[22] Filed: Jun. 22, 1998

[30] Foreign Application Priority Data

Jun. 20, 1997 [NL] Netherlands ............................ 1006368

[51] Int. Cl.⁶ .................................................. B65G 47/31
[52] U.S. Cl. ..................... 198/461.1; 198/577; 198/689.1
[58] Field of Search ................................ 198/459, 461.2, 198/461.3, 577, 689.1, 803.5, 470.1

[56] References Cited

U.S. PATENT DOCUMENTS

| | | | |
|---|---|---|---|
| 2,840,224 | 6/1958 | Lefiei ..................................... | 198/461.1 |
| 3,971,481 | 7/1976 | Longenecker et al. ............... | 198/461.1 |
| 4,815,581 | 3/1989 | Deutschlander ...................... | 198/689.1 |
| 5,341,915 | 8/1994 | Cordia et al. . | |
| 5,641,053 | 6/1997 | Nannini et al. ....................... | 198/461.1 |
| 5,881,860 | 3/1999 | Zecchi et al. ......................... | 198/689.1 |

FOREIGN PATENT DOCUMENTS

WO 93/15005  8/1993  WIPO .

Primary Examiner—William E. Terrell
Assistant Examiner—Khoi H. Tran
Attorney, Agent, or Firm—Young & Thompson

[57] ABSTRACT

A conveyor device for accelerating a series of products comprises a feed device for supplying products at a feed velocity, an acceleration device which is positioned downstream thereof, and a transfer device for taking up the accelerated products and delivering the products at regular intervals and at an accelerated velocity. The acceleration device comprises a transport path, with a belt of projections on either side thereof, which belt rotates at a lower velocity than the transport path. The transport path carries along the products at an accelerated velocity until they bear against the projections. After they have come to bear against the projections, the accelerated products are taken up by the transfer device. Due to the fact that the position of the projections is known at all times, an accurately determined position of the accelerated products is obtained in this way and shifts of the products which have occurred during acceleration are compensated for. The conveyor belt continues beyond the transfer device, and a relatively high suction force is exerted on the products, so that they are held in an accurately defined position. The products which are not taken up by the transfer device can be fed to a further processing station. The device according to the invention can be used to achieve an accurate product acceleration and transfer at a high working capacity, such as for example 800 to 1000 products per minute. The device may, for example, be used for delivering products which are supplied in the transverse direction of the products at regular intervals in the longitudinal direction of the products and allows a large number of different operations to be carried out on different groups of products.

4 Claims, 3 Drawing Sheets

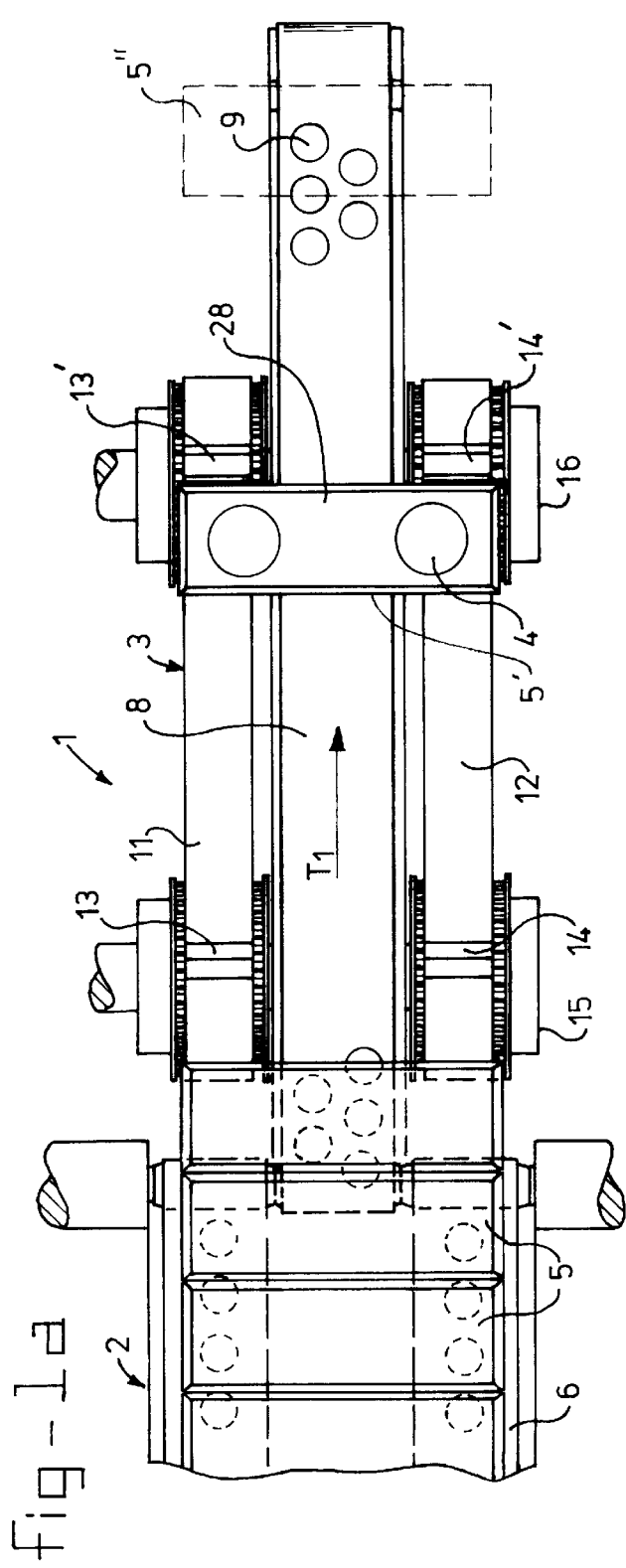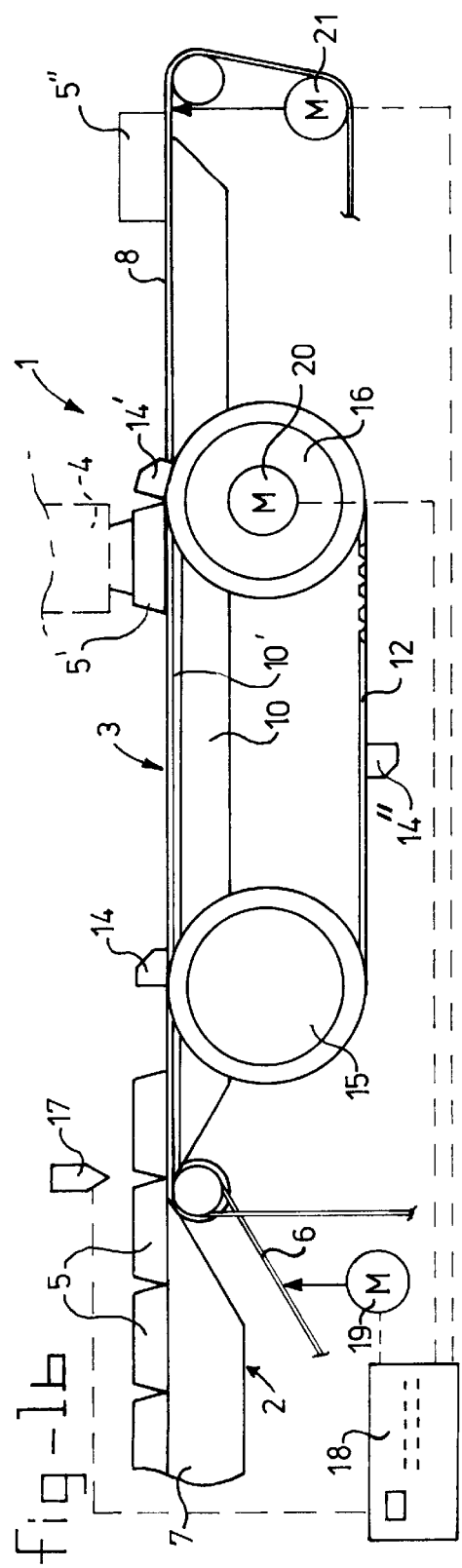

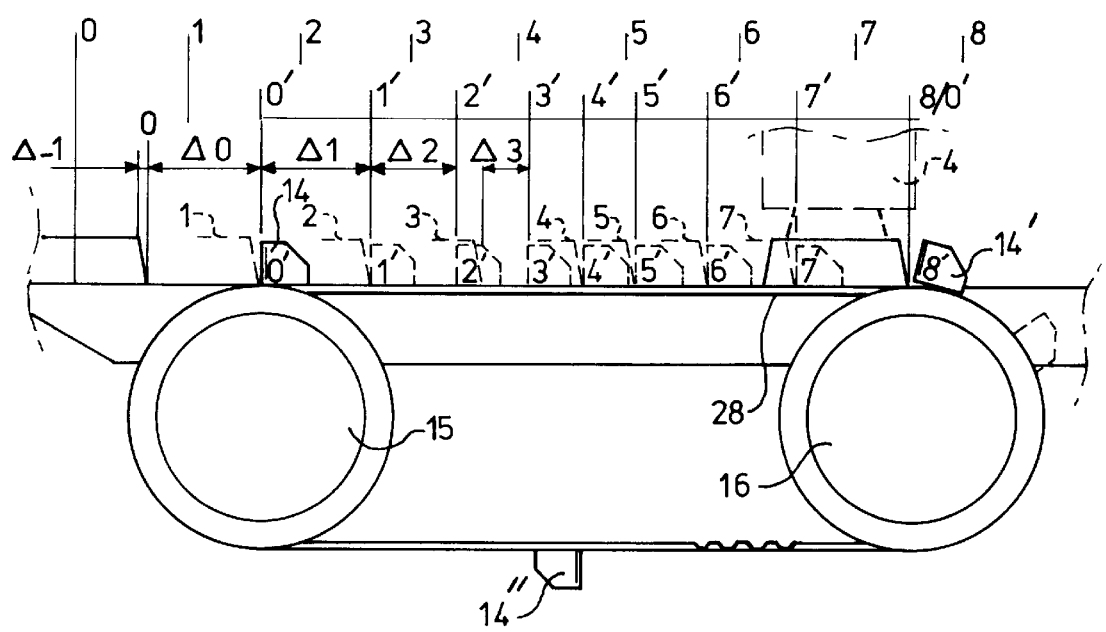

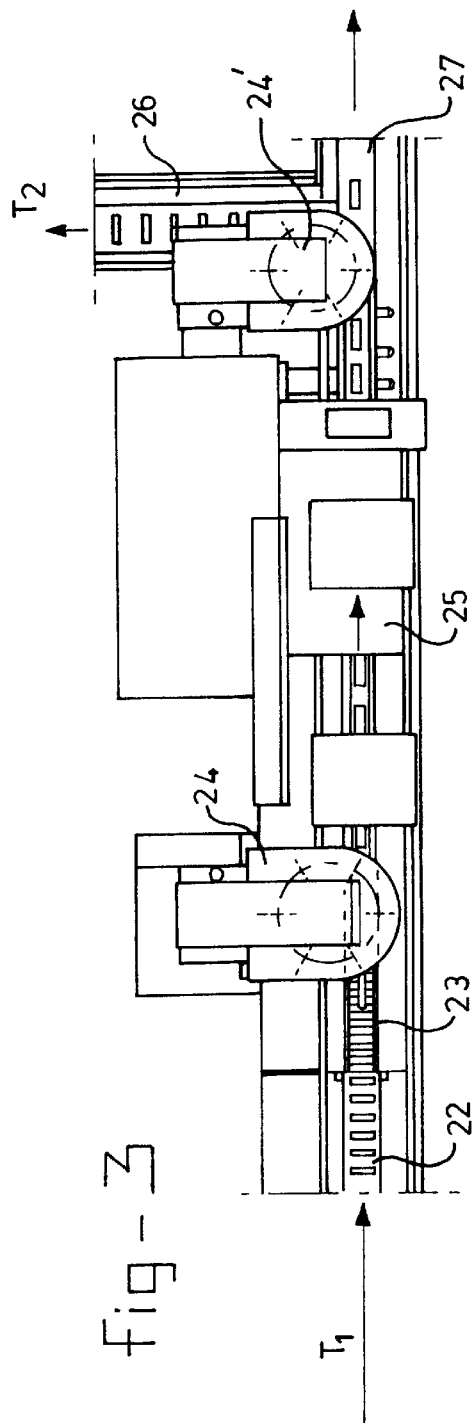
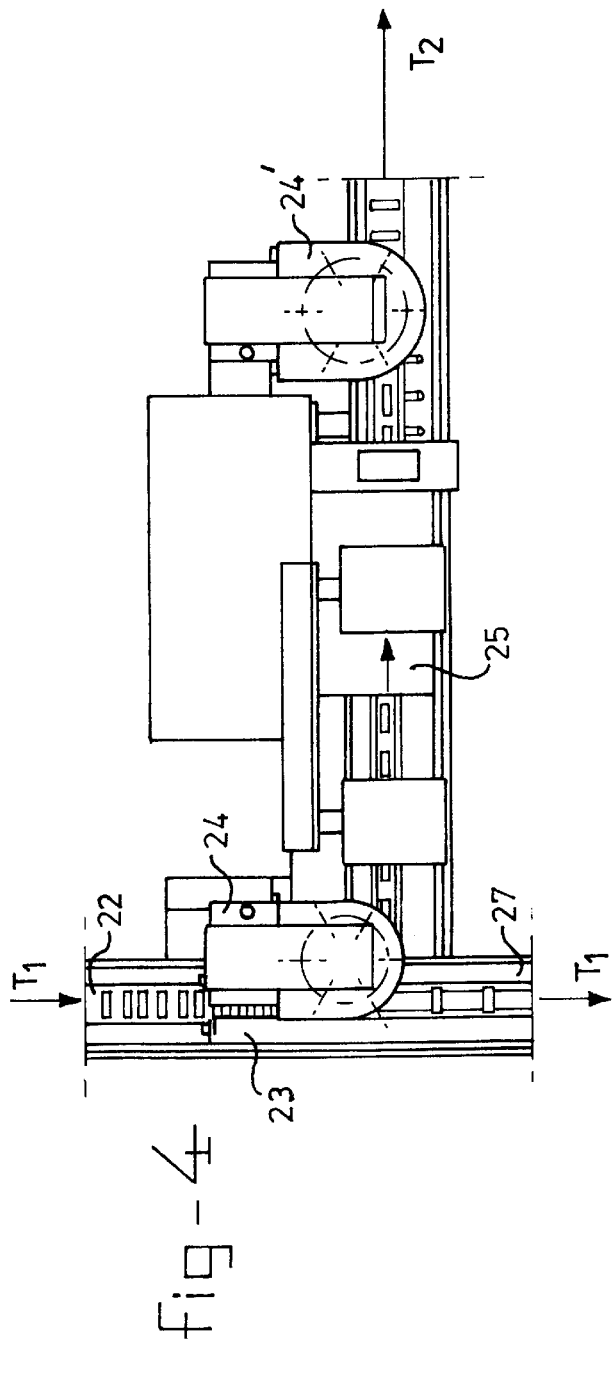

CONVEYOR DEVICE FOR ACCELERATING A SERIES OF PRODUCTS

FIELD OF THE INVENTION

The invention relates to a conveyor device for accelerating a series of products, comprising:

a feed device for supplying products at a first velocity $V_1$ along a transport path in the direction of transport, an acceleration device, which is positioned downstream of the feed device, for accelerating the products to a second velocity $V_2$, and a transfer device for taking an accelerated product off the acceleration device at a take-over position, the acceleration device comprising a transport path for conveying the products at a third velocity $V_3$ in the direction of transport, as well as a trajectory, which is situated along the transport path, of stop means which extend transversely to the transport path and are moved along the trajectory at the second velocity $V_2$, the velocity $V_3$ of the transport path being greater than the velocity $V_2$ of the stop means, and the difference in velocity between $V_2$ and $V_3$ being such that, at the location of the take-over position, in each case at least one product bears against a stop means.

BACKGROUND OF THE INVENTION

When packaging products, such as for example food products such as chocolate bars, biscuits and the like, these products are often delivered by the production installation in rows of transversely positioned products. By means of a feed system as described in European Patent No. EP-B-0,124,177, these rows of products can be fed to a packaging machine. The packaging machine comprises a film feed and a folding plate for folding the film around the products. The film tube formed is provided, by means of longitudinal sealing rolls, with a longitudinal seal and, by means of transverse sealing tools, with transverse seals which also cut through the film tube in order to form separate packages containing one or more products.

Dutch Patent No. 172429 describes a drag conveyor with carrier members for the purpose of separating products which bear against one another in the longitudinal direction and feeding them to the film feed at a constant mutual distance, i.e. at regular intervals. On a feed belt, the arriving products are moved towards an adjoining conveyor belt which moves at a higher speed, so that a gap between the products is obtained. A stop mechanism ensures that the products are delivered from the adjoining conveyor belt to the drag conveyor in the correct manner even when starting up the device.

To package products which are supplied in the transverse direction in single packages, it is desirable for the transversely positioned products to be fed to the packaging machine in the longitudinal direction of the products and at regular intervals. For this, it is necessary for the products not only to be changed in orientation but also to be accelerated from an arrival speed which is equal to the product of the product width and the working capacity to a delivery speed which is equal to the product of the product length+ intervening space and the working capacity.

A conveyor device for accelerating the products which are supplied in the transverse direction of the products and for delivering products at regular intervals in the longitudinal direction of the products is described in European patent application EP-A-0,711,720. In this device, a series of products supplied in the transverse direction is fed to an acceleration device via a conveyor belt which slopes upwards. The speed of the upwardly sloping conveyor belt is slower than the speed of the conveyor belt situated upstream thereof, so that products which are supplied at arbitrary intervals are conveyed onwards bearing against one another. Beneath the sloping conveyor belt, there is an acceleration device with a number of rotating gripper heads which grip the product fixedly in the region of the end of the conveyor belt and lift it up. After engaging on the product on the transport path, the gripper heads move radially outwards in order to lift the product off the transport path. Then, the product is accelerated by means of the gripper heads and is fed to a transfer device situated above the transport path. By means of the transfer device, the product is accelerated and guided further in the longitudinal direction of the product and at fixed intervals downstream of the acceleration device.

The position of the gripper heads of the known acceleration device is synchronized with the product position of the product to be accelerated by means of a photocell which is positioned in the region of the end of the upwardly sloping transport path. When the gripper head has reached the product to be accelerated, the gripper is displaced radially outwards by means of an electromagnet, in order to come into engagement with the product to be accelerated.

The known device is relatively complex, and consequently is susceptible to faults. When the product is taken up by a gripper head, the difference in velocity which occurs in this process between the product velocity on the sloping conveyor belt and the constant rotational speed of the gripper head can cause an undesirable shift of the product to take place. Furthermore, as a result of detecting the product position on entry and, as a function of this detection, regulating the acceleration device, there is little time available for correcting any errors. Due to the fact that the position detection of the product to be accelerated takes place at a relatively late stage, the capacity of the known device will be relatively limited. Furthermore, owing to the upwardly sloping conveyor belt, the known device takes up a relatively large amount of space and the device has various operating levels, which is not preferred from the point of view of ease of use.

A conveyor device in accordance with the preamble of claim 1 is known from U.S. Pat. No. 5,341,915. In this device, products which have been placed against one another are accelerated and, by means of a wire conveyor, are moved against projections which are moving at a relatively slow velocity. After the products have come to bear against the projections, the wire conveyor passes through amongst the products with a level of slippage. The projections are synchronized with the movement of a further conveyor with projections, so that the products are delivered thereto at fixed intervals.

SUMMARY OF THE INVENTION

One object of the present invention is to provide a simple and fault-free conveyor device for changing the arbitrary intervals between supplied products to regular intervals, so that a high operating capacity can be achieved. The acceleration device needs to be very operationally reliable, and uncontrolled product shifts caused by sudden changes in velocity need to be prevented as far as possible. A further object of the present invention is to provide a conveyor device which is relatively compact and which provides a high level of flexibility when dealing with the accelerated products.

To this end, the device according to the present invention is characterized in that the transport path comprises perforations and continues downstream of the take-over position, as well as vacuum retention means for exerting a suction force via the perforations, it being possible for the products to slip over the course of the transport path while the products are bearing against the stop means, and the suction force exerted on the products by the vacuum retention means downstream of the take-over position being greater than the suction force upstream of the take-over position.

According to the present invention, the products, along part of the trajectory of the stop means, catch up with the stop means and run up against the stop means from behind. Since the position of the stop means is accurately known at all times, an accurately defined product position of the products carried along behind the stop means is obtained at the location of the take-over position. Inaccuracies in the product position caused by a product shifting when it is taken from the feed device onto the acceleration device are compensated for. The present invention provides a very compact and simple acceleration device which ensures an accurate product position at a high operating capacity, such as for example 800–1000 products per minute or higher. The products can be taken up from the take-over position, at which they bear against a projection, the transport path being operated with a relatively low vacuum and rotating through beneath the products. However, the products may also move past the take-over position and then be conveyed further in an accurately defined position on the conveyor, while being held in an accurately defined position by means of a relatively powerful vacuum. This allows various groups of products to be formed, each of which groups undergo a different processing operation.

The difference in velocity between the velocity $V_3$ of the products along the transport path and the velocity $V_2$ of the stop means may be such that, in the region of the take-over position, in each case one product bears against the stop means. However, it is also possible for two or more products to bear against the stop means at the take-over position, due to the fact that, for example, the velocity $V_2$ of the stop means is considerably lower than the velocity $V_3$ along the transport path. As a result, it is possible to form groups of products which can be packaged together.

It is not necessary for the velocity $V_2$ of the stop means to be constant, but rather this velocity may, for example, vary sinusoidally around an average value. The varying velocity $V_2$ of the stop means can be used to adjust the interval between the products, which is effected with the aid of the stop means, as desired. Preferably, the velocity $V_2$ of the stop means is synchronized with the velocity of the transfer device.

According to one embodiment, the stop means comprise a narrow drive belt or drive chain on either side of the transport path and at least one projection on each drive belt. At relatively low velocities, it will be possible to employ a drive chain with a pusher as the projection. The products are carried along by the central path, which is positioned between the relatively slowly moving drive belts. When a product bears against the projections, the relatively narrow central transport path can easily rotate along beneath the product, and the engagement force exerted on the product is relatively low, owing to the narrow dimension of the central path. As a result of the projections or pusher pins on either side of the central path, any products which are incorrectly positioned are realigned.

Preferably, by means of the input device using a control unit based on a detection signal, the product position is adjusted so that the products are supplied to the acceleration device in a controlled manner.

BRIEF DESCRIPTION OF THE DRAWINGS

One embodiment of a conveyor device according to the present invention will be described in more detail with reference to the appended drawing, in which:

FIG. 1*a* shows a plan view of the device according to the present invention,

FIG. 1*b* shows a side view of the conveyor device in accordance with FIG. 1,

FIG. 2 diagrammatically depicts the relative positions of the stop means and an accelerated product for a number of successive points in time, and FIGS. 3 and 4 show a packaging device provided with an upstream and a downstream, with respect to the packaging machine, conveyor device according to the present invention with, respectively, a product discharge and product supply situated perpendicular to the direction of transport.

DETAILED DESCRIPTION OF THE INVENTION

FIGS. 1*a* and 1*b* show the conveyor device 1 according to the present invention, having a feed device 2 and an acceleration device 3. At the downstream end of the acceleration device 3, there is a transfer device, such as for example a gripper wheel, for taking up products, of which device only a gripper 4 is shown in FIGS. 1*a* and 1*b*. On the conveyor belt 6 of the feed device 2, the products 5 are supplied bearing against one another and in a transverse direction of the products. The products 5 comprise, for example, food products, such as biscuits or chocolate bars. The conveyor belt 6 is provided with perforations, through which a vacuum engages on the products, which vacuum is generated in the vacuum casing 7 beneath the conveyor belt 6. The feed velocity of the feed device 2 is adjusted around an average feed velocity.

From the feed device 2, the products 5 are transferred to the acceleration device 3 and the products are taken onto a relatively narrow central conveyor belt 8, on which they are held by means of perforations 9 and a vacuum generated in a vacuum casing 10. Then, the products are discharged at a higher velocity $V_3$ by the conveyor belt 8, in the direction of transport $T_1$, which is indicated by the arrow. A first and a second toothed belt 11, 12 rotate parallel to the central conveyor belt 8. Toothed belts 11, 12 are driven by means of drive wheels 15, 16 which are provided with toothing. A number of projections 13, 13' and 14, 14', 14", for example three projections per toothed belt, are positioned along the outer circumference of the toothed belts 11, 12. The velocity $V_2$ of the projections 13, 13', 14, 14', 14" in the direction of transport $T_1$ is slower than the velocity $V_3$ of the central conveyor belt 8. As a result, a product which is being carried along by the conveyor belt 8 runs up against the rear side of the projections, with the result that the product position is exactly determined from that moment. Then, the product is taken up by the gripper 4 at a take-over position 28 and is rotated, for example, through 90° and, in a second direction of transport which lies transversely to the first direction of transport, is delivered with a constant spacing, i.e. in regular intervals, in the longitudinal direction of the product. Downstream of the take-over position 28, the vacuum which the conveyor belt 8 exerts on the product via the perforations 9 is greater than upstream of the take-over position 28. By way of example, the perforations 9 may be larger than the perforations at the location of the toothed belts 11, 12. As a result, products 5" are held on the conveyor 8 in an accurately defined position and can be transported to a further processing station.

As shown in FIG. 1*b*, the conveyor belts 6 and 8, as well as the toothed belts 11, 12 are driven by means of an individual motor 19, 20 and 21. These motors are actuated by means of a control unit 18 which receives a detection signal from a detector 17, such as a photocell, which is situated in the region of the end of the feed device 2. On the basis of the detection signal from the photocell 17, the velocity of the conveyor belt 6 is varied, so that the products are delivered to the central conveyor belt 8 with a constant phase.

Upstream of the take-over position 28, a plate 10' may be arranged beneath the conveyor 8, which plate has relatively small perforations, so that the vacuum upstream of the take-over position 28 is reduced, so that slippage between the product 5' and the conveyor belt 8 is possible in that region. Downstream of the take-over position 28, the plate 10' is absent, so that the products 5" which are not taken hold of by the gripper 4 are then transported in an accurately defined position.

FIG. 2 shows the mutual position of a projection and a product along the acceleration device for nine different times T0–T8, the projection moving from position 0' to position 8'. At time $T_0$, the distance between the product and the projection at position 0' is equal to $\Delta 0$. After one time interval, the distance between the product 1 and the projection 1' is equal to $\Delta 1$, after two time intervals the distance between the product 2 and the projection 2' is equal to $\Delta 2$, after three time intervals the distance between the product 3 and the projection 3' is equal to $\Delta 3$, and after four time intervals the product 4 bears against the projection 4'. Then, the projection and the product are conveyed, at the velocity $V_2$ of the projection, to a take-over position 28, where the product is taken up by the gripper 4. As can be seen from FIG. 2, the velocity of the projection is not uniform, but rather it slows down for the path section between the two drive wheels 15 and 16, in order to be at a low velocity in the centre and then to accelerate after a product has come to bear against the projection. However, it is also possible to move the projection at a constant velocity. Although the present example shows that the toothed belts 11, 12 are situated in the plane of the conveyor belt 8 and the projections 13, 13', 14, 14', 14" are directed upwards, it is also possible to place the toothed belts 11, 12 above the conveyor belt 8, in which case the projections are directed downwards.

FIG. 3 shows an embodiment in which the products are supplied in the transverse direction of the products along a direction of transport $T_1$ on the supply belt 22. Then, the products are taken onto the feed device 23 of a conveyer device according to the present invention, only a transfer wheel 24 of which can be seen in the figure. By means of the transfer wheel 24 and the acceleration device situated beneath it, which is designed in accordance with FIGS. 1*a* and 1*b*, the products are placed at regular intervals and accelerated, in order then to be packaged in the packaging machine 25. The packaging machine 25 comprises a film feed (not shown in more detail) as well as longitudinal sealing rolls and transverse sealing tools for shaping a film packaging around each product. A second conveyor device according to the present invention is disposed downstream of the packaging machine 25, only the transfer wheel 24' of this conveyor device being shown. By means of this conveyor device, the products are placed, in the transverse direction of the products, onto a discharge belt 26, which runs in a second direction of transport $T_2$ which is situated perpendicular to the first direction of transport $T_1$. Via the discharge belt 26, the individually packaged products can be fed, for example, to a multipacker or a stacker. Products which are not taken hold of by the second transfer wheel 24' are discharged via a further conveyor belt 27 in the direction of transport $T_1$. The transfer wheel 24' can also be used without an acceleration device according to the invention.

FIG. 4 shows an arrangement in which the products are supplied in a direction of transport $T_1$, are accelerated by a transfer wheel 24 of a first conveyor device according to the present invention and are delivered at regular intervals and in the longitudinal direction of the products in a second direction of transport $T_2$, which is situated perpendicular thereto. Then, the products are packaged by means of the packaging machine 25 and, with the aid of a second conveyor device according to the invention comprising a second transfer wheel 24', are discharged, in the transverse direction of the products, in the second direction of transport $T_2$ towards, for example, a multipacker or stacker. In this case too, the second transfer wheel 24' may also be used without an acceleration device.

I claim:

1. A conveyor device for accelerating a series of products, comprising:

a feed device for supplying products at a first velocity $V_1$ along a path in a direction of transport;

an acceleration device positioned downstream of the feed device for accelerating the products to a second velocity $V_2$; and a transfer device for taking an accelerated product off the acceleration device at a take-over position downstream of the acceleration device;

said acceleration device comprising a transport path for conveying the products at a third velocity $V_3$ in the direction of transport, and a trajectory situated along the transport path and having stop means which extend transversely to the transport path, said stop means being moved along the trajectory at the second velocity $V_2$, the third velocity $V_3$ of the transport path being greater than the second velocity $V_2$ of the stop means, and the difference in velocity between the second velocity $V_2$ and the third velocity $V_3$ being such that, at the location of the take-over position, in each case at least one product bears against a stop means;

the transport path comprising perforations and continuing downstream of the take-over position; and vacuum retention means for exerting a suction force via the perforations;

whereby the products can slip over the course of the transport path while the products bear against the stop means, and the suction force exerted on the products by the vacuum retention means downstream of the take-over position is greater than the suction force upstream of the take-over position.

2. The conveyor device according to claim 1, wherein the velocity $V_2$ of the stop means is synchronized with the velocity of the transfer device and varies along the trajectory.

3. The conveyor device according to claim 1, wherein the stop means are attached to relatively narrow drive members, which are situated on either side of the transport path, with at least one projection on each drive member.

4. The conveyor device according to claim 1, further comprising a detector positioned in the vicinity of the feed device, for determining a product position and transmitting a detection signal to a control unit operatively associated with the conveyor device; said control unit having an output connected to a drive motor of the feed device for varying the velocity of the feed device as a function of the detection signal.

* * * * *